United States Patent
Lv et al.

(10) Patent No.: US 10,795,611 B2
(45) Date of Patent: Oct. 6, 2020

(54) EMPLOYING MULTIPLE QUEUEING STRUCTURES WITHIN A USERSPACE STORAGE DRIVER TO INCREASE SPEED

(71) Applicant: EMC IP Holding Company LLC, Hopkinton, MA (US)

(72) Inventors: Shuo Lv, Beijing (CN); Deric Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 16/050,591

(22) Filed: Jul. 31, 2018

(65) Prior Publication Data

US 2019/0042158 A1    Feb. 7, 2019

(30) Foreign Application Priority Data

Aug. 2, 2017    (CN) .......................... 2017 1 0650398

(51) Int. Cl.

| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 9/54* | (2006.01) |
| *G06F 11/07* | (2006.01) |

(52) U.S. Cl.
CPC ............ *G06F 3/0659* (2013.01); *G06F 3/061* (2013.01); *G06F 3/0683* (2013.01); *G06F 3/0688* (2013.01); *G06F 9/545* (2013.01); *G06F 11/0727* (2013.01)

(58) Field of Classification Search
CPC ......... G06F 3/061; G06F 9/545; G06F 3/0659

USPC ........................................................ 711/114
See application file for complete search history.

(56) References Cited

U.S. PATENT DOCUMENTS

| 8,452,901 B1 | 5/2013 | Sandstrom et al. |
| 9,378,047 B1 | 6/2016 | Gould et al. |
| 2016/0378545 A1* | 12/2016 | Ho .............................. G06F 9/46 718/107 |

OTHER PUBLICATIONS

Bjorling, Matias et al.; "Linux Block IO: Introducing Multi-queue SSD Access on Multi-core Systems"; SYSTOR 13 Jun. 30-Jul. 2, 2013, Haifa, Israel; 10 pages.
Chen, Feng et al.; "Internal Parallelism of Flash Memory-Based Solid-State Drives"; ACM Transactions on Storage, vol. 12, No.3, Article 13; Publication date: May 2016.

* cited by examiner

*Primary Examiner* — Edward J Dudek, Jr.
*Assistant Examiner* — Sidney Li
(74) *Attorney, Agent, or Firm* — BainwoodHuang

(57) ABSTRACT

Performance in multi-core data storage systems is increased while allowing for portability and fast failover in the event of a failure of a driver stack by a data storage system employing several queues to reduce lock contention. Queueing is performed with two levels of several queues each within a userspace scheduling driver within a userspace container. The userspace scheduling driver may dequeue into a userspace management driver that communicates with a kernel-based hardware driver by way of a kernel helper driver. An apparatus, system, and computer program product for performing a similar method are also provided.

20 Claims, 2 Drawing Sheets

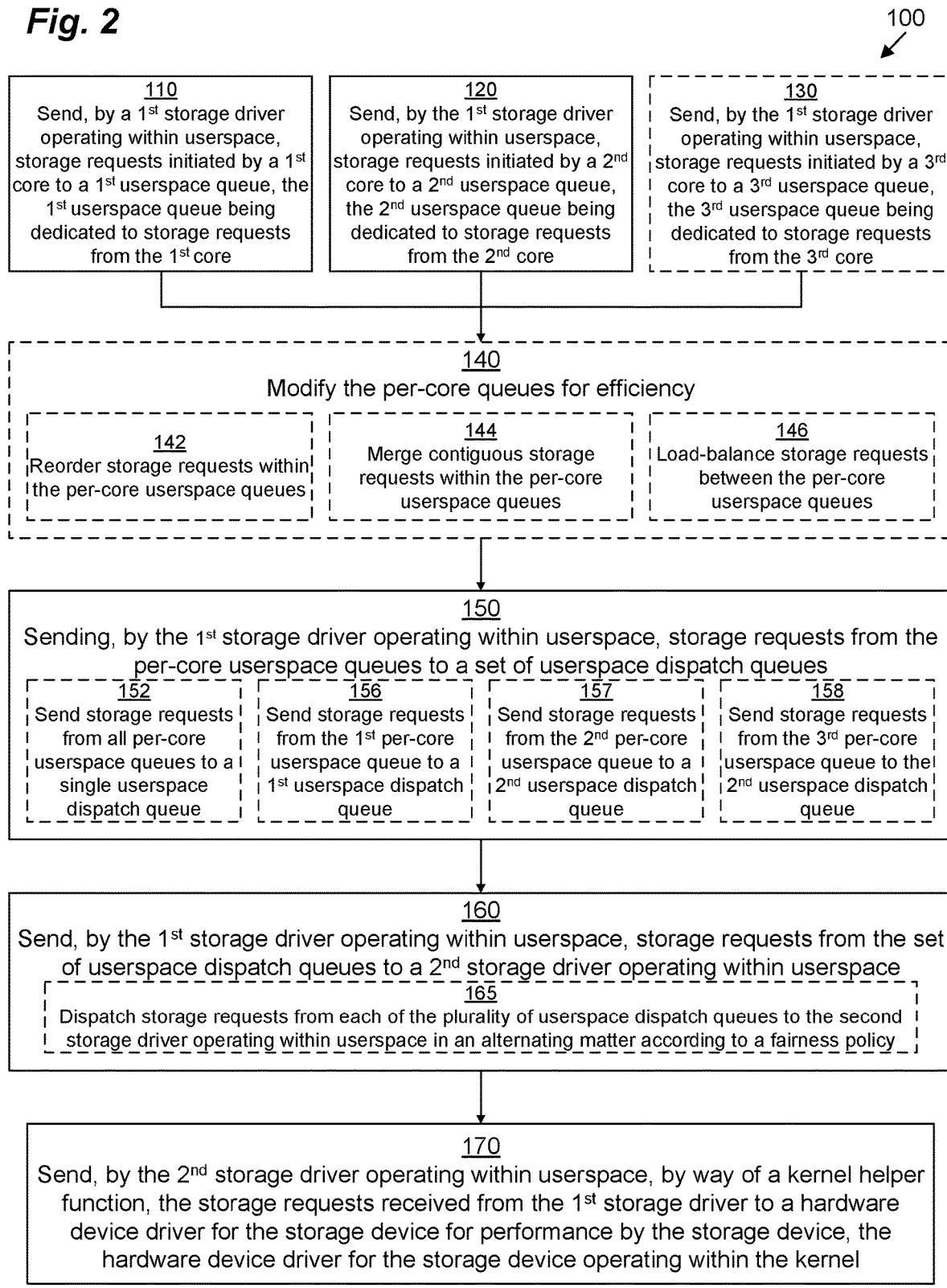

EMPLOYING MULTIPLE QUEUEING STRUCTURES WITHIN A USERSPACE STORAGE DRIVER TO INCREASE SPEED

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems employ a storage stack to process and transform I/O operations from one format to another to increase speed and versatility. Once an I/O operation is transformed into a set of low-level I/O operations directed at physical extents of storage on storage drives, these low-level I/O operations may be queued and executed according to various policies to ensure fairness and increase efficiency.

SUMMARY

Unfortunately, conventional data storage systems that utilize several parallel processing cores may experience performance limitations when a large number of low-level I/O operations are directed to a physical drive within a short period of time. Such limitations are largely due to lock contention on the queue between the several processing cores. Contention may become more noticeable when modern flash-based drives capable of processing several concurrent I/O operations are used, as those devices are capable of processing several hundred thousand I/O operations (or more) per second, which can easily overwhelm a single queue having a lock contention issue.

Thus, it would be desirable to decrease performance degradation due to locking. Such a result may be accomplished by a data storage system employing several queues to reduce lock contention. It would further be desirable to perform this queuing within a userspace driver within a userspace container to allow for portability and fast failover to a new userspace container in the event of a failure of the driver stack. This may be accomplished by performing the queueing with two levels of several queues within a userspace scheduling driver within a userspace container. The userspace scheduling driver may dequeue into a userspace management driver that communicates with a kernel-based hardware driver by way of a kernel helper driver.

In some embodiments, a method of processing storage requests directed to a storage device of a computing device having a plurality of processing cores (hereinafter "cores") is performed. The method includes (a) sending, by a first storage driver operating within userspace of the computing device, storage requests initiated by a first core of the computing device to a first userspace queue, the first userspace queue being dedicated to storage requests from the first core, (b) sending, by the first storage driver operating within userspace, storage requests initiated by a second core of the computing device to a second userspace queue, the second userspace queue being dedicated to storage requests from the second core, the second core being distinct from the first core, and the second userspace queue being distinct from the first userspace queue, (c) sending, by the first storage driver operating within userspace, storage requests from the first userspace queue and the second userspace queue to a set of userspace dispatch queues, the first userspace queue and the second userspace queue not belonging to the set of userspace dispatch queues, (d) sending, by the first storage driver operating within userspace, storage requests from the set of userspace dispatch queues to a second storage driver operating within userspace of the computing device, the second storage driver being distinct from the first storage driver, and (e) sending, by the second storage driver operating within userspace, by way of a kernel helper function, the storage requests received from the first storage driver to a hardware device driver for the storage device for performance by the storage device, the hardware device driver for the storage device operating within a kernel of the computing device. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2 is a flowchart depicting example methods of various embodiments.

DETAILED DESCRIPTION OF THE INVENTION

Figure 1:
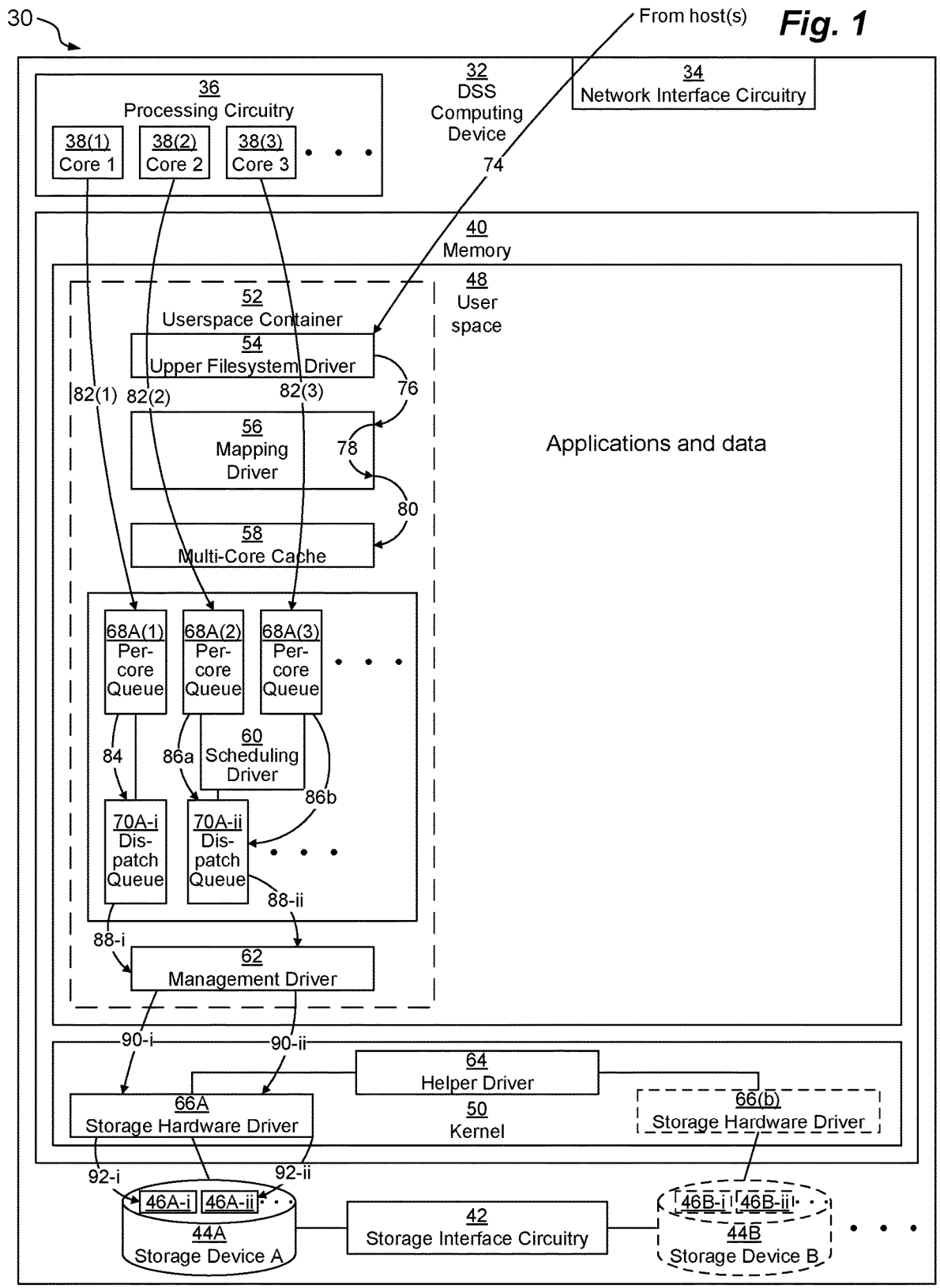
FIG. 1 is a block diagram depicting an example system and apparatus for use in connection with various embodiments.

Embodiments are directed to techniques for increasing performance in multi-core data storage systems while allowing for portability and fast failover in the event of a failure of the driver stack. This may be accomplished by a data storage system employing several queues to reduce lock contention. The queueing is performed with two levels of several queues each within a userspace scheduling driver within a userspace container. The userspace scheduling driver may dequeue into a userspace management driver that communicates with a kernel-based hardware driver by way of a kernel helper driver.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. Typically, computing device 30 is a DSS rack server.

DSS computing device 32 includes network interface circuitry 34, processing circuitry 36, memory 40, storage interface circuitry 42, and persistent data storage drives 44 (depicted as storage device 44A, optional storage device 44B, . . . ). DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 34 allows the DSS computing device 32 to communicate with one or more host devices (not depicted) capable of sending data storage commands to the DSS computing device for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processing circuitry 36 includes multiple processing cores 38 (depicted as cores 38(1), 38(2), 38(3), . . . ). Each core 38 may be a distinct physical core or it may be a virtual core (e.g., due to hyper-threading). Thus, for example, if DSS computing device 32 includes two microprocessors, each microprocessor having four physical cores with hyper-threading enabled, then the DSS computing device 32 would have a total of sixteen cores 38. In some embodiments, DSS computing device 32 may be built as a set of two or more storage processors (SPs, not depicted) each mounted on a separate board, each SP having its own network interface circuitry 34, processing circuitry 36, memory 40, and storage interface circuitry 42, but sharing the storage devices 44 between them. In such embodiments, a high-speed inter-SP bus may connect the SPs. There may be more than one SP installed in DSS 30 for redundancy and performance reasons. In these embodiments, each SP may be considered independently for purposes of this disclosure.

Persistent storage drives 44 may include any kind of persistent storage devices, such as, for example, hard disk drives, solid-state storage devices (SSDs), flash drives, etc. In a typical embodiment, one or more of the storage devices 44 (e.g., storage drive 44A) is an SSD or a flash drive having multiple channels 46 (depicted as channels 46A-i, 46A-ii, . . . ) allowing more than one storage operation to be performed by that storage device 44A simultaneously.

Storage interface circuitry 42 controls and provides access to persistent storage drives 44. Storage interface circuitry 42 may include, for example, SCSI, SAS, ATA, SATA, FC, M.2, and/or other similar controllers and ports.

Memory 40 may be any kind of digital system memory, such as, for example, random access memory (RAM). Memory 40 stores an operating system (OS) kernel 50 in operation (e.g., a Linux, UNIX, Windows, MacOS, or similar operating system kernel). Memory 40 also includes a userspace portion 48 within which non-kernel OS applications (not depicted) as well as user applications (not depicted) and data (not depicted) may be stored.

As is well-known in the art, only the kernel 50 and applications running within the kernel 50 have direct access to the hardware of the DSS computing system 32. Any application running within userspace 48 may access the hardware only by means of a system call to the kernel 50. Although functions may execute faster if implemented within the kernel 50 (e.g., as hardware drivers, such as storage hardware drivers 66 and helper driver 64), the more complex the kernel 50 becomes, the more likely the kernel 50 is to crash, which can require the entire DSS 32 (or SP) to reboot, which can cause significant downtime. Thus, it is desirable to implement complex functionality (such as a complex storage driver stack) within userspace 48 to avoid crashing the kernel 50. It is further desirable to implement the storage driver stack entirely within its own userspace container 52 so that in the event of a crash, only the userspace container 52 need be restarted, while other applications running within userspace 48 may continue operating, which allows for even further decreased downtime in the event of a crash. Use of a userspace container 52 also allows for easy portability between SP. Implementation within userspace 48 also allows for easy upgrading of the kernel 50 without having to recompile and test new OS upgrades prior to upgrading.

As depicted, a storage stack for storage operations on the DSS computing device 32 is implemented using userspace drivers 54, 56, 58, 60, and 62. Upper filesystem driver 54 is configured to receive file-based storage requests 74 from hosts, each file-based storage request 74 being directed at a filesystem (not depicted) that is ultimately backed by storage from one or more of the storage devices 44 of the DSS computing device 32. Upper filesystem driver 54 translates those requests 74 into block-based storage requests 76 directed to particular blocks of storage of a volume or logical disk (not depicted) on which the filesystem rests. Upper filesystem driver 54 sends those block-based storage requests 76 to mapping driver 56.

In some embodiments, mapping driver 56 implements the logical volume using a container file (not depicted) of a lower-deck filesystem (not depicted). Thus, in these embodiments, mapping driver 56 translates block-based requests 76 into file-based requests 78 aimed at the container file. Mapping driver 56 further implements the lower-deck filesystem on a second virtual volume (not depicted) made up of storage extents (not depicted) drawn from the one or more storage devices 44. In some embodiments, mapping driver 56 further introduces address translations due to de-duplication, RAID, and other services. Thus, mapping driver 56 translates file-based requests 78 back into block-based requests 80 to particular storage drives 44, which it sends down the storage stack to multi-core cache 58.

Multi-core cache 58 is a layer of the driver stack that makes use of a dedicated portion (not depicted) of memory 40 (which may include some persistent or battery-backed memory, not depicted) to store data relating to the block-based storage requests for fast performance optimized for execution by several cores 38 operating in parallel. Typically, once a block-based storage request 80 is placed within multi-core cache 58 (and either placed in persistent memory or mirrored to a backup copy on another SP), it may be acknowledged up the stack, allowing the host to continue as if the original storage request 74 had been fully-executed, even though the data has not yet been flushed to the ultimate backing store on storage devices 44. In the background, the cores 38 work to flush this cached data to the storage devices 44.

Each core 38 is configured to perform this flushing by sending one or more low-level data storage commands 82 that are each aimed at a particular address range of a particular storage drive 44 to the next layer of the storage stack, which is scheduling driver 60. For any given storage drive 44A, scheduling driver 60, which may also be referred to as a Physical Package driver, schedules the execution of commands 82 directed at that storage drive 44A, which is important when there are many simultaneous commands 82 directed to the same storage drive 82 coming from several different cores 38.

Each core 38 sends its respective storage commands 82 (depicted as storage commands 82(1), 82(2), 82(3), corresponding to cores 38(1), 38(2), 38(3), respectively) to a particular per-core queue 68 (depicted as per-core userspace queues 68A(1), 68A(2), 68A(3), . . . ). Each per-core queue 68 is dedicated to storage commands 82 from a particular core 38(*x*) aimed at a particular storage device 44Y. For each particular storage device 44Y, there may be up to as many per-core queues 68 as there are cores 38 within processing circuitry 36. In some embodiments, it is possible that certain cores 38 of processing circuitry 36 may be configured not to send storage commands 82 to flush the multi-core cache 58 (e.g., certain cores 38 may be dedicated to other tasks). In these embodiments, the number of per-core queues 68 for each particular storage device 44Y may instead be limited to the number of cores 38 that are available for sending storage commands 82. Thus, for example, if processing circuitry 36 includes four cores 38, but only three of those cores 38(1), 38(2), 38(3) are available for sending storage commands 82, then there would be three per-core userspace queues 68A(1), 68A(2), 68A(3) for storage device 44A.

Upon receiving each storage command 82, scheduling driver 60 places it into the appropriate per-core userspace queue 68 (at the head of each queue). In some embodiments, scheduling driver 60 may perform various re-ordering and/or merging operations on the various storage commands 82 within each per-core userspace queue 68. In some embodiments, scheduling driver 60 may perform load-balancing operations by shifting various storage commands 82 between the per-core userspace queues 68.

Scheduling driver 60 dequeues storage commands 82 from the tail of each per-core userspace queue 68A for a particular storage device 44A to an appropriate userspace dispatch queue 70 of a set of such dispatch queues 70A (depicted as dispatch queues 70A-i, 70A-ii, . . . ) associated with that particular storage device 44A. If there are the same number of per-core userspace queue 68A for a particular storage device 44A as there are dispatch queues 70A for that particular storage device 44A, then each per-core userspace queue 68A dequeues directly to the head of a dedicated dispatch queue 70A. Thus, for example, if there were only two per-core userspace queues 68A(1), 68A(2), then per-core userspace queue 68A(1) would dequeue from its tail to the head of dispatch queue 70A-i, and per-core userspace queue 68A(2) would dequeue from its tail to the head of dispatch queue 70A-ii. As depicted, since there are three per-core userspace queue 68A(1), 68A(2), 68A(3) but only two dispatch queues 70A-i, 70A-ii, per-core userspace queue 68A(1) dequeues from its tail by sending a storage command 84 to the head of dispatch queue 70A-i, while per-core userspace queues 68A(2), 68A(3) alternate dequeuing from their respective tails by respectively sending storage commands 86*a*, 86*b* to the head of dispatch queue 70A-ii.

Scheduling driver 60 typically refrains from performing re-ordering, merging, and load-balancing operations on the dispatch queues 70.

Scheduling driver 60 dequeues storage commands 88 from the tail of each dispatch queue 70A for a particular storage device 44A aimed at a respective channel 46A of that particular storage device 44A. Thus, for example, as depicted, scheduling driver 60 dequeues storage commands 88-*i* from the tail of dispatch queue 70A-i aimed at channel 46A-i of storage drive 44A and storage commands 88-*ii* from the tail of dispatch queue 70A-ii aimed at channel 46A-ii of storage drive 44A. It should be understood that, in some embodiments, instead of dequeuing aimed at particular channels 46, scheduling driver 60 may simply dequeue in a round-robin manner from the dispatch queues 70A for particular storage drive 44A, relying on a built-in queue (not depicted) of that particular storage drive 44A to execute the operations in parallel on its various channels 46A.

It should be understood that scheduling driver 60 does not dequeue the storage commands 88 directly to the channels 46A (or directly to the storage device 44A), since a userspace driver such as scheduling driver 60 cannot communicate directly with the hardware. In addition, there are additional management tasks such as link initialization, link services, PHY management, and I/O support that are performed by intervening management driver 62. Since management driver 62 also runs within userspace 48, it is able to communicate with the storage hardware driver 66 running in the kernel 50 through a kernel helper driver 64. See, for example, U.S. Pat. No., 9,612,756 issued on Apr. 4, 2017, the entire contents and teachings of which are incorporated by reference herein by this reference. Thus, management driver 62 forwards storage commands 88-*i*, 88-*ii* as respective storage commands 90-*i*, 90-*ii* to storage hardware driver 66A for storage drive 44A. To the extent that certain communications between management driver 62 within userspace 48 and storage hardware driver 66A within the kernel 50 are prohibited (or not possible), helper driver 64 is used to forward such communications across the barrier between userspace 48 and the kernel 50. Eventually, storage hardware driver 66A forwards storage commands 90-*i*, 90-*ii* as respective storage commands 92-*i*, 92-*ii* to storage drive 44A or its respective channels 46A-i, 46A-ii.

In some embodiments, memory 40 may also include a persistent storage portion (not depicted). Persistent storage portion of memory 40 may be made up of one or more persistent storage devices, such as, for example, disk drives, solid state drives, and the like. Persistent storage portion of memory 40 or persistent storage drives 44 is configured to store programs and data even while the DSS computing device 32 is powered off. The OS, applications, and drivers 54, 56, 58, 60, 62, 64, 66 are typically stored in this persistent storage portion of memory 40 or on persistent storage drives 44 so that they may be loaded into a system portion of memory 40 from this persistent storage portion of memory 40 or persistent storage drives 44 upon a system restart. These applications and drivers 54, 56, 58, 60, 62, 64, 66, when stored in non-transient form either in the volatile portion of memory 40 or on persistent storage drives 44 or in persistent portion of memory 40, form a computer program product. The processing circuitry 36 running one or more of these applications and drivers 54, 56, 58, 60, 62, 64, 66 thus forms a specialized circuit constructed and arranged to carry out the various processes described herein.

FIG. 2 illustrates an example method 100 performed by the various drivers 54, 56, 58, 60, 62, 64, 66 of the storage stack and/or the kernel 50. It should be understood that any time a piece of software (e.g., drivers 54, 56, 58, 60, 62, 64, 66, kernel 50, etc.) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Method 100 is performed by DSS computing device 32.

Steps 110 and 120 (and, in embodiments in which step 130 is performed, also step 130) may be performed in parallel. Being performed in parallel means that the order of execution of these steps 110, 120 (and 130) is unimportant;

they may be performed simultaneously, in an overlapping manner, or any of them may be performed prior to or subsequent to the other(s).

In step 110, scheduling driver 60 operating within userspace 48 (and, in some embodiments, more particularly within a dedicated userspace container 52) sends storage requests (e.g., storage commands 82(1)) that were initiated by first core 38(1) (towards particular storage drive 44A) to a first userspace per-core queue 68A(1), the first userspace per-core queue 68A(1) being dedicated to storage requests 82(1) that came from that first core 38(1) directed to particular storage drive 44A.

In step 120, scheduling driver 60 operating within userspace 48 (and, in some embodiments, more particularly within a dedicated userspace container 52) sends storage requests (e.g., storage commands 82(2)) that were initiated by second core 38(2) (towards particular storage drive 44A) to a second userspace per-core queue 68A(2), the second userspace per-core queue 68A(2) being dedicated to storage requests 82(2) that came from that second core 38(2) directed to particular storage drive 44A.

In optional step 130 (which may be omitted in systems that only have two cores 38(1), 38(2) or which only have two cores 38(1), 38(2) permitted to process flushes from the multi-core cache 58), scheduling driver 60 operating within userspace 48 (and, in some embodiments, more particularly within a dedicated userspace container 52) sends storage requests (e.g., storage commands 82(3)) that were initiated by third core 38(3) (towards particular storage drive 44A) to a third userspace per-core queue 68A(3), the third userspace per-core queue 68A(3) being dedicated to storage requests 82(3) that came from that third core 38(3) directed to particular storage drive 44A.

In some embodiments, scheduling driver 60 may perform step 140, in which the contents of the various per-core queues 68 may be modified for efficiency reasons. Typically, step 140 is omitted for any per core queues 68A that are associated with storage drives 44A that are SSDs or are flash-based (or otherwise have minimal latency for random seeks). Step 140 may include one or more of sub-steps 142, 144, 146.

In sub-step 142, scheduling driver 60 re-orders storage commands 82($x$) stored within a per-core queue 68A($x$). For example, if there are two different storage commands 82($x$)-I and 82($x$)-II that are directed to extents of storage drive 44A that are in close physical proximity to each other, scheduling driver 60 may re-order the queue 68A($x$) so that those two storage commands 82($x$)-I, 82($x$)-II are performed consecutively instead of having another storage commands 82($x$)-III directed to a distant extent intervening.

In sub-step 144, scheduling driver 60 merges storage commands 82($x$) stored within a per-core queue 68A($x$). For example, if there are two different storage commands 82($x$)-I and 82($x$)-II that are both write commands directed at consecutive extents of storage drive 44A, scheduling driver 60 may merge these two storage commands 82($x$)-I, 82($x$)-II into a single storage command 82($x$)-IV that writes to a merged larger extent.

In sub-step 146, scheduling driver 60 load-balances between the per-core queues 68A. For example, if per-core queue 68A(1) has 1,000 pending storage requests 82(1) therein and per-core queue 68A(2) has only 17 pending storage requests 82(2) therein, scheduling driver 60 may transfer some of the pending storage requests 82(1) from the per-core queue 68A(1) to per-core queue 68A(2).

In step 150, scheduling driver 60 operating within userspace 48 (and, in some embodiments, more particularly within a dedicated userspace container 52) sends storage requests (e.g., storage commands 84, 86a, 86b) from the userspace per-core queues 68A to the set of userspace dispatch queues 70A for storage drive 44A.

In one embodiment, if there is only a single userspace dispatch queue 70A-i for storage drive 44A, then, in sub-step 152, scheduling driver 60 dequeues the storage commands 84, 86a, 86b from all of the userspace per-core queues 68A to the single userspace dispatch queue 70A-i for storage drive 44A.

Alternatively, if there are at least two userspace dispatch queues 70A-i, 70A-ii, then sub-steps 156 and 157 (and possibly also 158) are performed.

In sub-step 156, scheduling driver 60 dequeues the storage commands 84 from at least one userspace per-core queue 68A(1) to userspace dispatch queue 70A-i for storage drive 44A, while, in sub-step 157, scheduling driver 60 dequeues the storage commands 86a from a different userspace per-core queue 68A(2) to a different userspace dispatch queue 70A-ii for storage drive 44A. If there are more userspace per-core queues 68A than userspace dispatch queue 70A for storage drive 44A, then, in sub-step 158, scheduling driver 60 dequeues the storage commands 86b from a third userspace per-core queue 68A(3) to the same userspace dispatch queue 70A-ii as in sub-step 157.

In step 160, scheduling driver 60 operating within userspace 48 (and, in some embodiments, more particularly within a dedicated userspace container 52) sends storage requests (e.g., storage commands 88) from the set of userspace dispatch queues 70A to another driver operating within userspace 48, namely management driver 62. In some embodiments, the storage commands 88 are sent from particular dispatch queues 70A to corresponding dispatch queues (not depicted) within management driver. In other embodiments, in optional sub-step 165, scheduling driver 60 dispatches the storage commands 88 from the various userspace dispatch queues 70A to management driver 62 (having only a single queue therein, not depicted) in an alternating manner according to a fairness policy.

In step 170, the other driver operating within userspace 48, namely management driver 62, sends, by way of kernel helper driver 64, the storage requests 88 received from scheduling driver 60 as storage requests 90 to storage hardware driver 66A within the kernel 50. The storage hardware driver 66A is then able to pass these storage requests 90 on to the storage drive 44A as storage requests 92 for execution by the storage drive 44A. In some embodiments, storage hardware driver 66A passes particular storage requests 92-$i$ to first channel 46A-$i$ and other storage requests 92-$ii$ to second channel 46A-$ii$. In other embodiments, a local queue (not depicted) within storage drive 44A distributes the storage requests 92 between the various channels 46A for execution as they become available.

Thus, techniques have been presented for increasing performance in multi-core data storage systems 32 while allowing for portability and fast failover in the event of a failure of the driver stack. This may be accomplished by a data storage system 32 employing several queues 68, 70 to reduce lock contention. The queueing is performed with two levels of several queues 68, 70 each within a userspace scheduling driver 60 within a userspace container 52. The userspace scheduling driver 60 may dequeue into a userspace management driver 62 that communicates with a kernel-based hardware driver 66 by way of a kernel helper driver 64.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

What is claimed is:

1. A method of processing storage requests directed to a storage device of a computing device having a plurality of processing cores, the method comprising:
    enqueuing, by a first storage driver operating within userspace of the computing device, storage requests initiated by a first core of the computing device onto a first userspace queue, the first userspace queue being dedicated to storage requests from the first core;
    enqueuing, by the first storage driver operating within userspace, storage requests initiated by a second core of the computing device onto a second userspace queue, the second userspace queue being dedicated to storage requests from the second core;
    transferring, by the first storage driver operating within userspace, storage requests from the first userspace queue and the second userspace queue to a set of userspace dispatch queues, the first userspace queue and the second userspace queue not belonging to the set of userspace dispatch queues;
    sending, by the first storage driver operating within userspace, storage requests from the set of userspace dispatch queues to a second storage driver operating within userspace of the computing device; and
    sending, by the second storage driver operating within userspace, by way of a kernel helper function, the storage requests received from the first storage driver to a hardware device driver for the storage device for performance by the storage device, the hardware device driver for the storage device operating within a kernel of the computing device.

2. The method of claim 1
    wherein the storage device is configured to process a plurality of storage requests concurrently;
    wherein the set of userspace dispatch queues includes a plurality of userspace dispatch queues; and
    wherein transferring storage requests from the first queue and the second queue to the set of userspace dispatch queues includes:
        enqueuing storage requests from the first userspace queue onto a first userspace dispatch queue of the set of userspace dispatch queues; and
        enqueuing storage requests from the second userspace queue onto a second userspace dispatch queue of the set of userspace dispatch queues.

3. The method of claim 2 wherein the method further comprises:
    enqueuing, by the first storage driver operating within userspace, storage requests initiated by a third core of the computing device onto a third userspace queue, the third userspace queue being dedicated to storage requests from the third core; and
    transferring, by the first storage driver operating within userspace, storage requests from the third userspace queue to the second userspace dispatch queue for performance by the storage device,
    wherein transferring the storage requests from the third userspace queue to the second userspace dispatch queue is interleaved with transferring the storage requests from the second userspace queue to the second userspace dispatch queue.

4. The method of claim 2 wherein a number of the plurality of userspace dispatch queues is equal to a number of the plurality of storage requests that the storage device is configured to process concurrently.

5. The method of claim 2 wherein sending the storage requests from the set of userspace dispatch queues to the second storage driver operating within userspace includes dispatching storage requests from each of the plurality of userspace dispatch queues to the second storage driver operating within userspace in an alternating matter according to a fairness policy.

6. The method of claim 1 wherein sending the storage requests from the set of userspace dispatch queues to the second storage driver operating within userspace includes dispatching storage requests from each of the plurality of userspace dispatch queues without reordering or merging the storage requests.

7. The method of claim 1 wherein the first storage driver operating within userspace performs reordering of storage requests within the first userspace queue and the second userspace queue.

8. The method of claim 7 wherein the first storage driver operating within userspace performs merging of contiguous storage requests within the first userspace queue and the second userspace queue.

9. The method of claim 1 wherein the method further comprises performing load-balancing of storage requests between the first userspace queue and the second userspace queue.

10. The method of claim 1
wherein the storage device is one of a plurality of storage devices of the computing system; and
wherein the second storage driver running within userspace is configured to manage the plurality of storage devices.

11. The method of claim 1, further comprising communicating, by the kernel helper function, hardware interrupts between the hardware device driver for the storage device operating within the kernel and the second storage driver running within userspace.

12. The method of claim 1, wherein the first storage driver, the first userspace queue, the second storage driver, the second userspace queue, and the set of userspace dispatch queues operate together within a single userspace container.

13. A computing apparatus for processing storage requests directed to a storage device of the computing apparatus, the computing apparatus comprising processing circuitry having a plurality of processing cores coupled to memory configured to:
enqueue, by a first storage driver operating within userspace of the computing apparatus, storage requests initiated by a first core of the computing apparatus onto a first userspace queue, the first userspace queue being dedicated to storage requests from the first core;
enqueue, by the first storage driver operating within userspace, storage requests initiated by a second core of the computing apparatus onto a second userspace queue, the second userspace queue being dedicated to storage requests from the second core;
transfer, by the first storage driver operating within userspace, storage requests from the first userspace queue and the second userspace queue to a set of userspace dispatch queues, the first userspace queue and the second userspace queue not belonging to the set of userspace dispatch queues;
send, by the first storage driver operating within userspace, storage requests from the set of userspace dispatch queues to a second storage driver operating within userspace of the computing apparatus; and
send, by the second storage driver operating within userspace, by way of a kernel helper function, the storage requests received from the first storage driver to a hardware device driver for the storage device for performance by the storage device, the hardware device driver for the storage device operating within a kernel of the computing apparatus.

14. The computing apparatus of claim 13, wherein the first storage driver, the first userspace queue, the second storage driver, the second userspace queue, and the set of userspace dispatch queues are configured to operate together within a single userspace container.

15. The computing apparatus of claim 14
wherein the storage device is configured to process a plurality of storage requests concurrently;
wherein the set of userspace dispatch queues includes a plurality of userspace dispatch queues; and
wherein the processing circuitry configured to transfer storage requests from the first queue and the second queue to the set of userspace dispatch queues is further configured to:
enqueue storage requests from the first userspace queue onto a first userspace dispatch queue of the set of userspace dispatch queues; and
enqueue storage requests from the second userspace queue onto a second userspace dispatch queue of the set of userspace dispatch queues.

16. The computing apparatus of claim 14 wherein the processing circuitry configured to send the storage requests from the set of userspace dispatch queues to the second storage driver operating within userspace is further configured to dispatch storage requests from each of the plurality of userspace dispatch queues without reordering or merging the storage requests.

17. A computer program product including a non-transitory, computer-readable storage medium storing instructions which, when executed by the computing device, cause the computing device to perform a method of processing storage requests directed to a storage device of a computing device having a plurality of processing cores, the method comprising:
enqueuing, by a first storage driver operating within userspace of the computing device, storage requests initiated by a first core of the computing device onto a first userspace queue, the first userspace queue being dedicated to storage requests from the first core;
enqueuing, by the first storage driver operating within userspace, storage requests initiated by a second core of the computing device onto a second userspace queue, the second userspace queue being dedicated to storage requests from the second core;
transferring, by the first storage driver operating within userspace, storage requests from the first userspace queue and the second userspace queue to a set of userspace dispatch queues, the first userspace queue and the second userspace queue not belonging to the set of userspace dispatch queues;
sending, by the first storage driver operating within userspace, storage requests from the set of userspace dispatch queues to a second storage driver operating within userspace of the computing device; and
sending, by the second storage driver operating within userspace, by way of a kernel helper function, the storage requests received from the first storage driver to a hardware device driver for the storage device for performance by the storage device, the hardware device driver for the storage device operating within a kernel of the computing device.

18. The computer program product of claim 17, wherein the first storage driver, the first userspace queue, the second storage driver, the second userspace queue, and the set of userspace dispatch queues operate together within a single userspace container.

19. The computer program product of claim 18
wherein the storage device is configured to process a plurality of storage requests concurrently;
wherein the set of userspace dispatch queues includes a plurality of userspace dispatch queues; and
wherein transferring storage requests from the first queue and the second queue to the set of userspace dispatch queues includes:
enqueuing storage requests from the first userspace queue onto a first userspace dispatch queue of the set of userspace dispatch queues; and
enqueuing storage requests from the second userspace queue onto a second userspace dispatch queue of the set of userspace dispatch queues.

20. The computer program product of claim 18 wherein sending the storage requests from the set of userspace dispatch queues to the second storage driver operating within userspace includes dispatching storage requests from each of the plurality of userspace dispatch queues without reordering or merging the storage requests.

\* \* \* \* \*